United States Patent
Farrow et al.

(10) Patent No.: US 11,290,149 B2
(45) Date of Patent: Mar. 29, 2022

(54) IDENTIFYING INTERFERING LINKS IN LOCAL AREA NETWORKS

(71) Applicant: BRITISH TELECOMMUNICATIONS PUBLIC LIMITED COMPANY, London (GB)

(72) Inventors: Nicholas Farrow, London (GB); Adrian Thurlow, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 190 days.

(21) Appl. No.: 16/754,196

(22) PCT Filed: Sep. 25, 2018

(86) PCT No.: PCT/EP2018/075950
§ 371 (c)(1),
(2) Date: Apr. 7, 2020

(87) PCT Pub. No.: WO2019/072546
PCT Pub. Date: Apr. 18, 2019

(65) Prior Publication Data
US 2021/0194540 A1    Jun. 24, 2021

(30) Foreign Application Priority Data

Oct. 10, 2017 (EP) .................................. 17195703

(51) Int. Cl.
*H04B 3/32* (2006.01)
*H04B 3/487* (2015.01)
(Continued)

(52) U.S. Cl.
CPC .............. *H04B 3/32* (2013.01); *H04B 3/487* (2015.01); *H04B 3/542* (2013.01); *H04M 11/06* (2013.01); *H04B 2203/5445* (2013.01)

(58) Field of Classification Search
USPC .............. 379/145, 399.01, 413.02, 414, 417
See application file for complete search history.

(56) References Cited

U.S. PATENT DOCUMENTS 3,559,665 A    2/1971  Davis
4,642,806 A    2/1987  Hewitt
(Continued)

FOREIGN PATENT DOCUMENTS

CN    102440052 A    5/2012
CN    102647720 A    8/2012
(Continued)

OTHER PUBLICATIONS

Notice of Allowance dated Jan. 15, 2021 issued in U.S. Appl. No. 16/651,692 (13 pgs.).
(Continued)

*Primary Examiner* — Yosef K Laekemariam
(74) *Attorney, Agent, or Firm* — Nixon & Vanderhye P.C.

(57) ABSTRACT

Methods, apparatus and devices are disclosed for identifying and of controlling communications on interfering links in a local area network (20) having user-devices (22, 23, 24, 25) located therein operable to communicate via a local area network (LAN) gateway device (30, 50) with remote devices in a communications network (10,15) outside the LAN (20), communications being carried via one or more LAN links (28) for at least a portion of a path between user-devices (22, 23, 24, 25) and the gateway device (30, 50), and being carried via a digital subscriber (xDSL) line (19) for at least a portion of a path between the gateway device (30, 50) and the remote devices. The method comprises triggering performance of a signal transmission action on a LAN link during a predetermined period; monitoring digital subscriber line (DSL) performance characteristics in respect of data communications on the xDSL line (19) during said predetermined period whereby to identify changes therein; clas- (Continued)

Impact Analyser (IA) Flowchart ("passive" monitoring)

sifying the LAN link as an interfering link in the event that identified changes in DSL performance characteristics coincide with the predetermined period during which the signal transmission action has been performed; and adjusting the data flow rate in respect of data flow on a LAN link if it is classified as an interfering link.

15 Claims, 9 Drawing Sheets

(51) Int. Cl.
   *H04B 3/54* (2006.01)
   *H04M 11/06* (2006.01)

(56) References Cited

U.S. PATENT DOCUMENTS

| | | | |
|---|---|---|---|
| 5,004,314 A | 4/1991 | Booth | |
| 5,757,912 A | 5/1998 | Blow | |
| 5,953,421 A | 9/1999 | Townsend | |
| 6,529,877 B1 | 3/2003 | Murphy | |
| 6,738,819 B1 | 5/2004 | Li | |
| 7,447,791 B2 | 11/2008 | Leaning | |
| 7,643,417 B2 | 1/2010 | Van Nieuwenhuizen | |
| 7,974,200 B2 | 7/2011 | Walker | |
| 8,271,852 B2 | 9/2012 | Kirkby | |
| 8,442,149 B2 | 5/2013 | Humphrey | |
| 9,479,223 B2 | 10/2016 | Wallace | |
| 9,497,065 B2 | 11/2016 | Rizzo | |
| 9,525,460 B1 | 12/2016 | Vazquez et al. | |
| 2003/0218549 A1 | 11/2003 | Logvinov | |
| 2005/0233464 A1 | 10/2005 | Compton | |
| 2005/0249245 A1* | 11/2005 | Hazani | H04L 5/06 370/485 |
| 2008/0247537 A1 | 10/2008 | Hemy | |
| 2011/0053528 A1 | 3/2011 | Cunningham | |
| 2012/0106606 A1* | 5/2012 | Samy | H04L 5/0062 375/222 |
| 2013/0339529 A1 | 12/2013 | Rizzo | |
| 2014/0086290 A1 | 3/2014 | Samy | |
| 2014/0269860 A1 | 9/2014 | Brown | |
| 2015/0134809 A1 | 5/2015 | Tofighbakhsh | |
| 2015/0381236 A1 | 12/2015 | Wallace | |
| 2016/0365897 A1 | 12/2016 | Gross et al. | |
| 2017/0006504 A1 | 1/2017 | Townend | |
| 2017/0111807 A1 | 4/2017 | Townend | |
| 2017/0155547 A1 | 6/2017 | Lockyer | |
| 2017/0244446 A1 | 8/2017 | Al Rawi | |
| 2017/0288996 A1 | 10/2017 | Farrow | |
| 2017/0295044 A1 | 10/2017 | Oksman | |
| 2018/0343068 A1 | 11/2018 | Afkhami | |
| 2019/0281166 A1 | 9/2019 | Horsley | |
| 2019/0288744 A1 | 9/2019 | Horsley | |
| 2020/0221518 A1 | 7/2020 | Schmitz | |
| 2020/0235781 A1 | 7/2020 | Farrow | |

FOREIGN PATENT DOCUMENTS

| | | | | |
|---|---|---|---|---|
| CN | 102801445 A | | 11/2012 | |
| CN | 103368661 A | | 10/2013 | |
| CN | 103460646 A | | 12/2013 | |
| CN | 105103527 A | | 11/2015 | |
| CN | 206004657 U | | 3/2017 | |
| EP | 2 775 696 | | 9/2014 | |
| EP | 2775696 | * | 9/2014 | ............ H04M 11/00 |
| EP | 2 793 403 | | 10/2014 | |
| GB | 2566964 A | | 4/2019 | |
| WO | 2007081171 A1 | | 7/2007 | |
| WO | 2014/051630 | | 4/2014 | |
| WO | 2015/144538 | | 10/2015 | |
| WO | 2019/063537 | | 4/2019 | |
| WO | 2019/072546 A1 | | 4/2019 | |

OTHER PUBLICATIONS

Office Action dated Mar. 29, 2021 issued in Chinese Application No. 201880065841.7 (7 pages) and Translation (7 pages).
Office Action dated Mar. 9, 2021 issued in Chinese Application No. 201880063129.3 (7 pages).
U.S. Appl. No. 16/651,692 to Farrow, et al., filed Mar. 27, 2020 entitled "Controlling Communications in Respect of Local Area Networks" (30 pages).
"Mitigation of interference between DSL and PLC", ITU-T G.9977, ITU-T Standard, International Telecommunication Union, Feb. 26, 2016, 48 pages.
"G.hn, G.vdsl, G.fast : Powerline Interference Indication and Mitigation for DSL transceivers", Ravi Mantri Metanoia Technologies Inc., ITU-T Draft; Study Period 2013-2016, International Telecommunication Union, vol. $^{18}/_{15}$, $^{4}/_{15}$, Oct. 29, 2013, 16 pages.
Combined Search and Examination Report for GB Application No. 1716570.5 dated Mar. 13, 2018, 6 pages.
Extended European Search Report for GB Application No. 17195703.8 dated Feb. 12, 2018, 9 pages.
International Search Report and Written Opinion of the ISA for PCT/EP2018/075950 dated Oct. 31, 2018, 12 pages.
ITU-T Telecommunication Standardization Sector of ITU, Series G.9961 (Jul. 2015): Series G: "Transmission Systems and Media, Digital Systems and Networks, Access Networks—In Premises Networks, Unified High-Speed Wireline-Based Home Networking Transceivers—Data Link Layer Specification" 390 pages.
Combined Search and Examination Report for GB Application No. 1715720.7 dated Mar. 13, 2018, 5 pages.
Extended European Search Report for GB Application No. 17193783.2 dated Feb. 23, 2018, 9 pages.
International Search Report and Written Opinion of the ISA for PCT/EP2018/075947 dated Oct. 23, 2018, 11 pages.
Office Action dated Mar. 27, 2020 issued in U.S. Appl. No. 16/651,692 (15 pgs.).

* cited by examiner

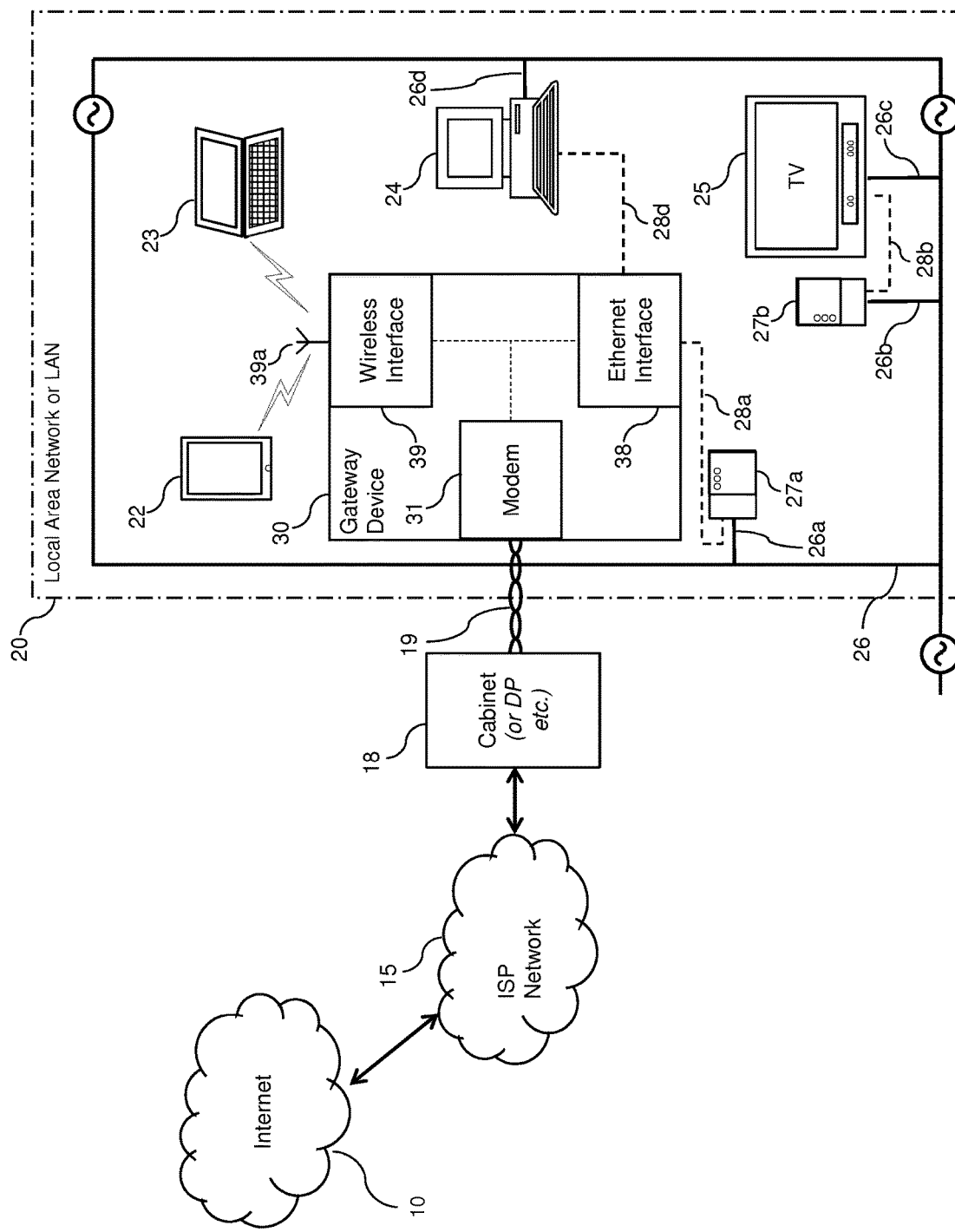
Figure 1: Connectivity of User-Devices within a Local Area Network

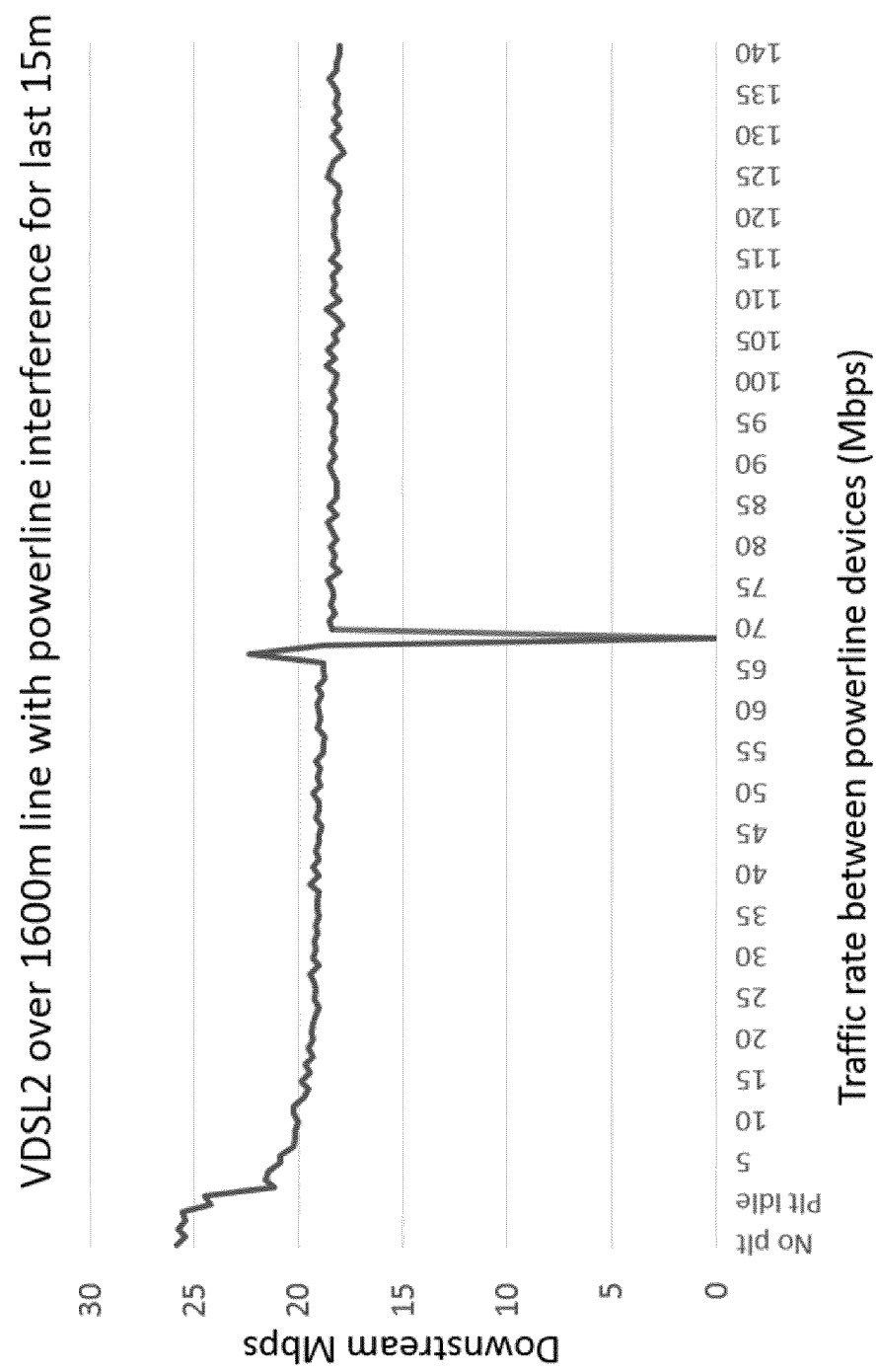
Figure 2: VDSL Degradation Related to Powerline Traffic Rate

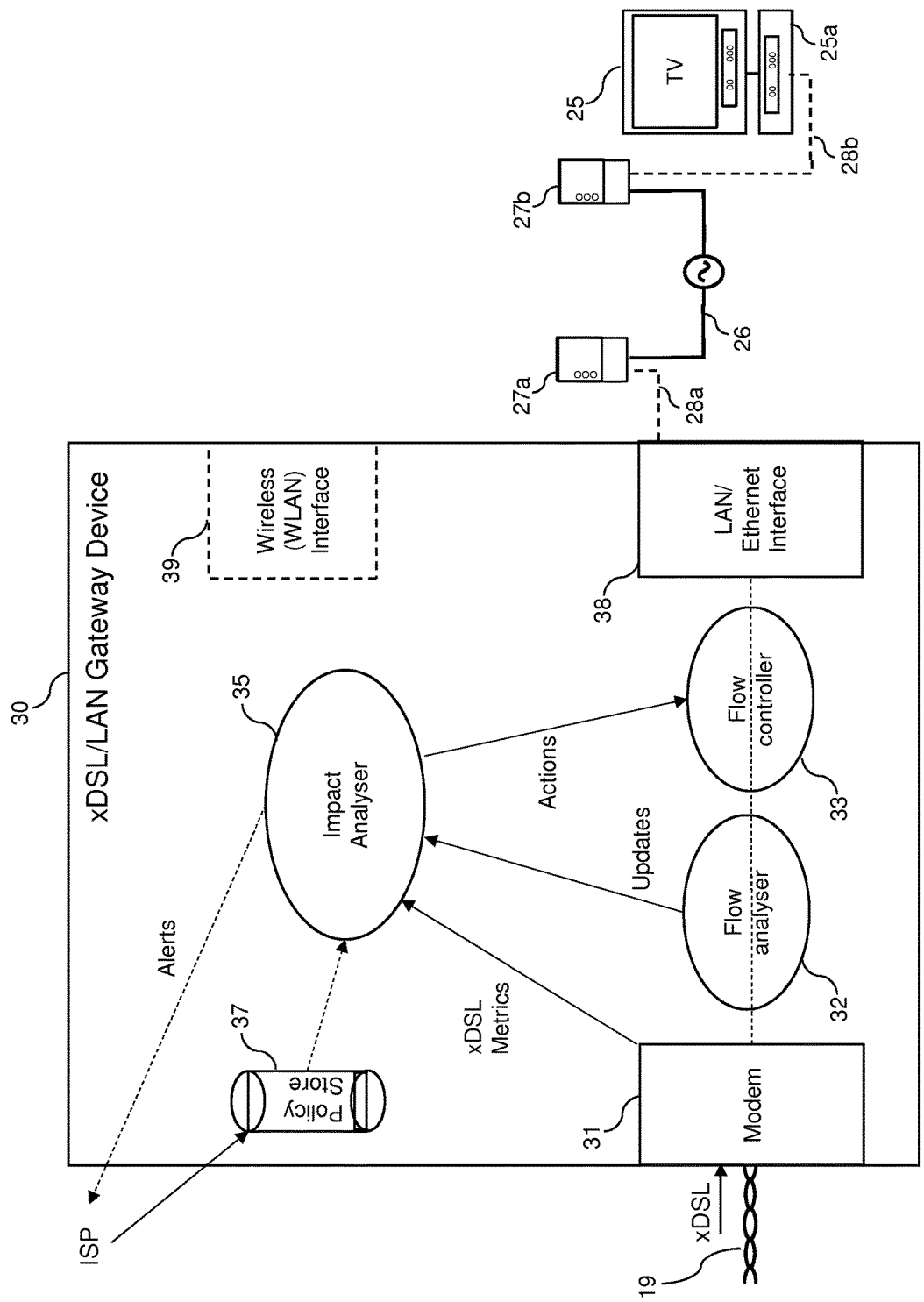
Figure 3: Architecture of Local Area Network Gateway Device ("passive" monitoring)

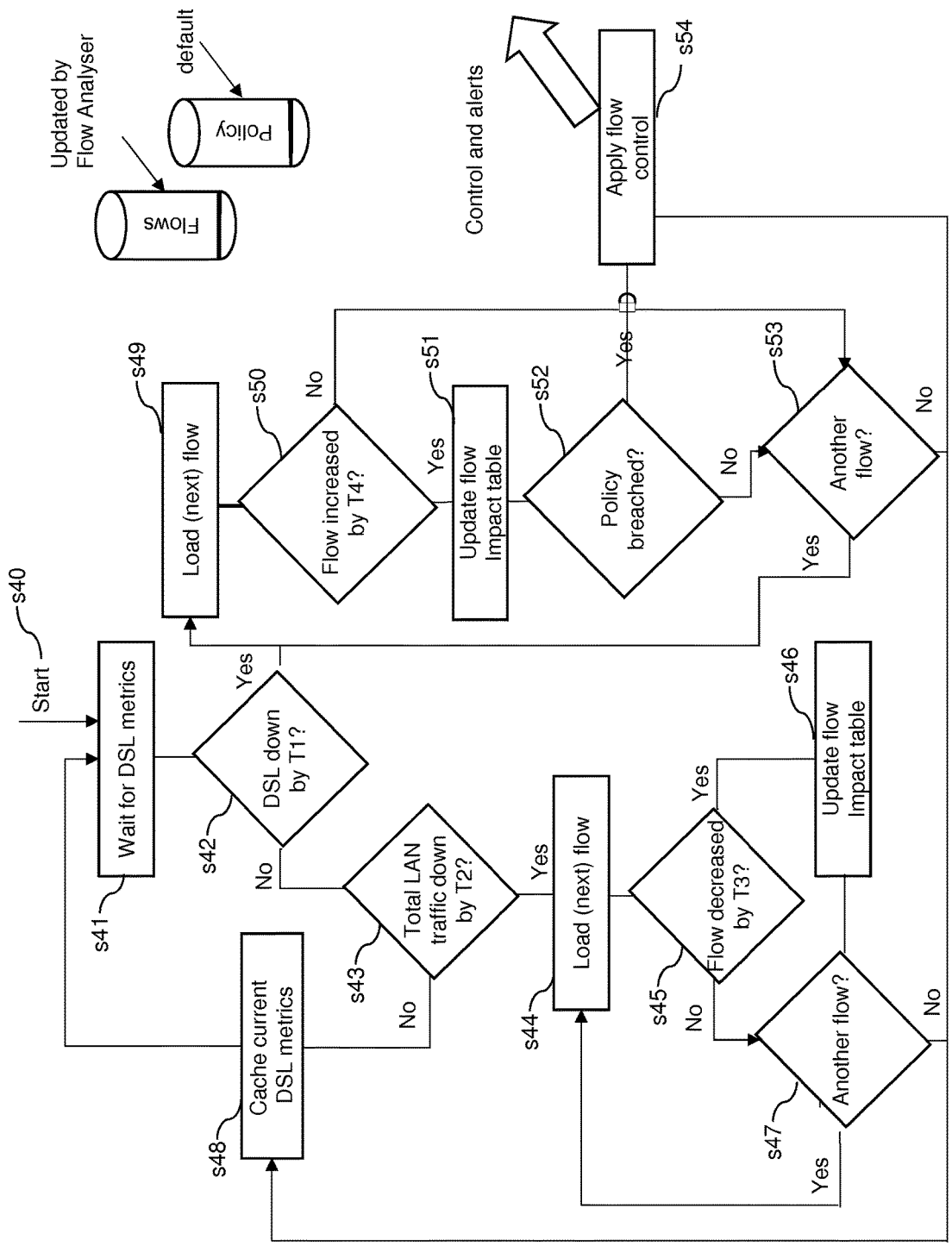
Figure 4: Impact Analyser (IA) Flowchart ("passive" monitoring)

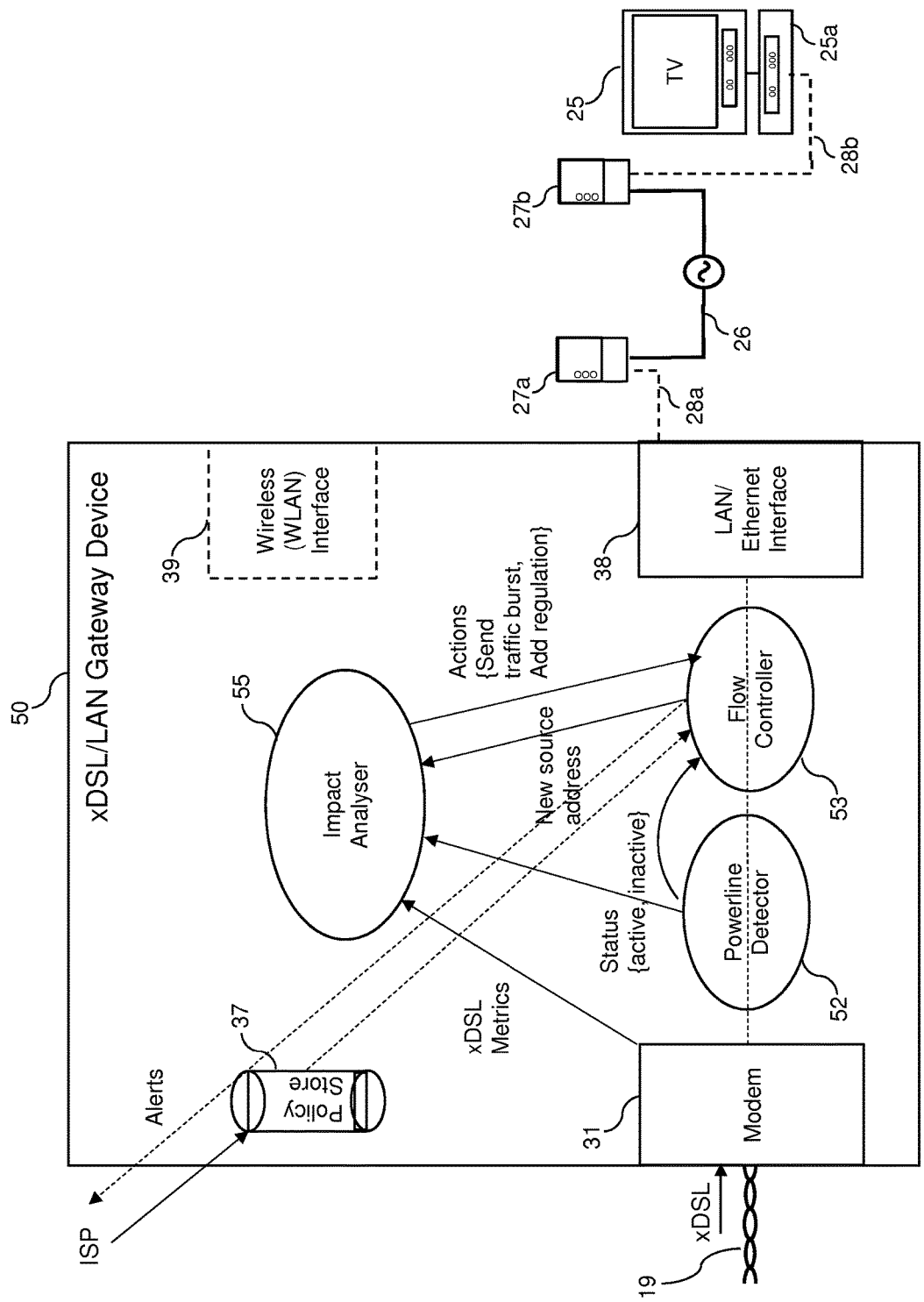
Figure 5: Architecture of Local Area Network Gateway Device ("active" monitoring)

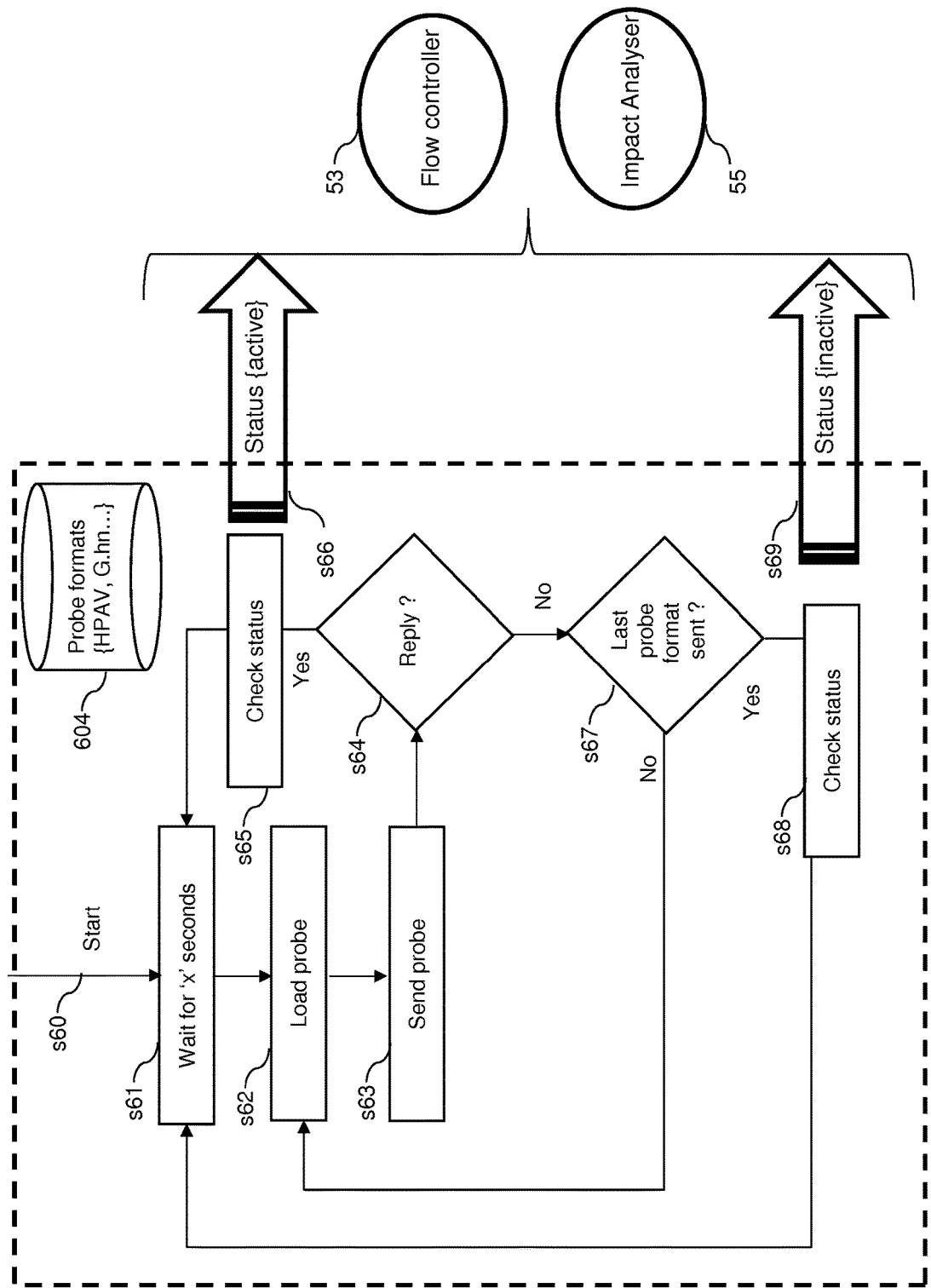
Figure 6: Powerline Detector flowchart

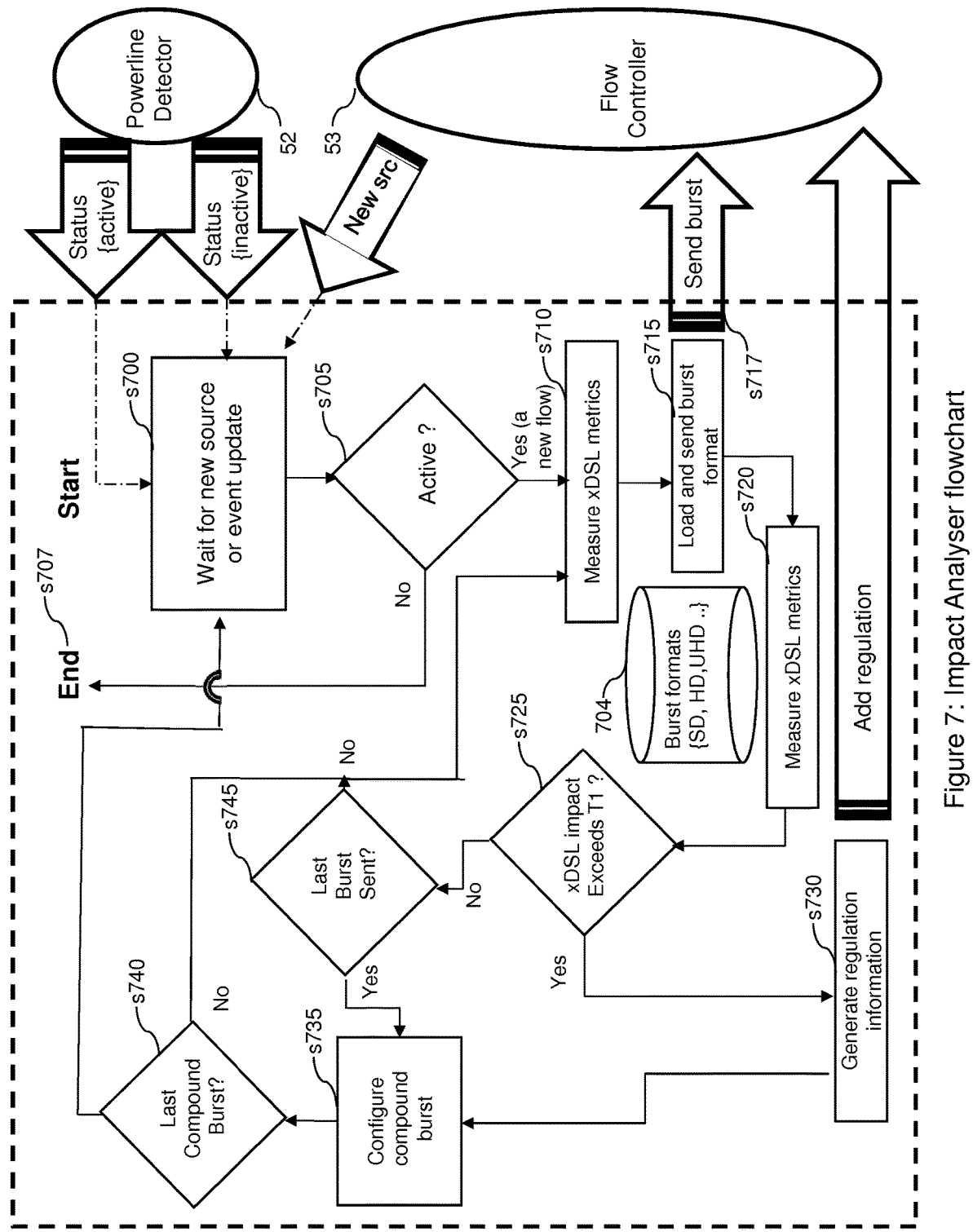
Figure 7: Impact Analyser flowchart

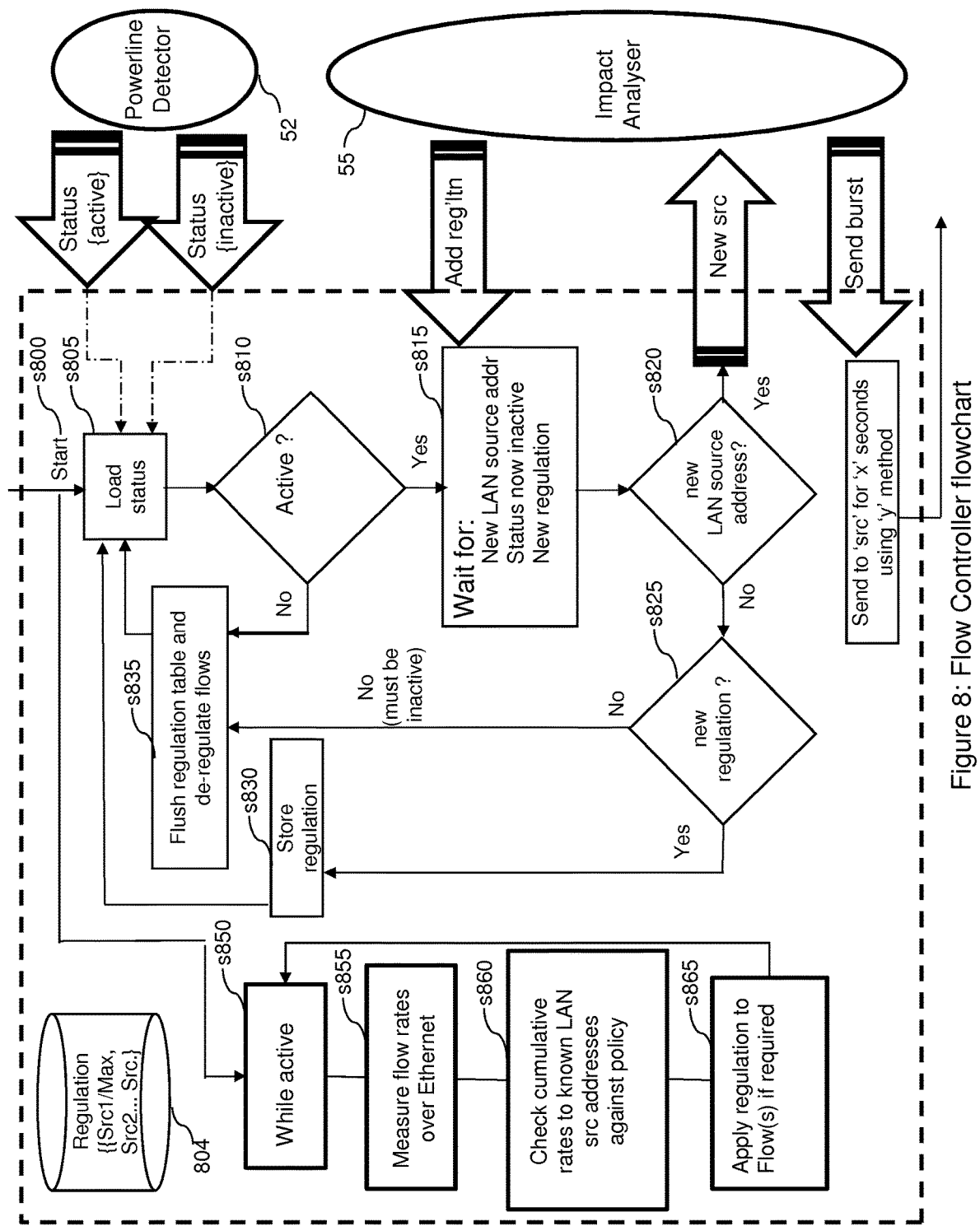
Figure 8: Flow Controller flowchart

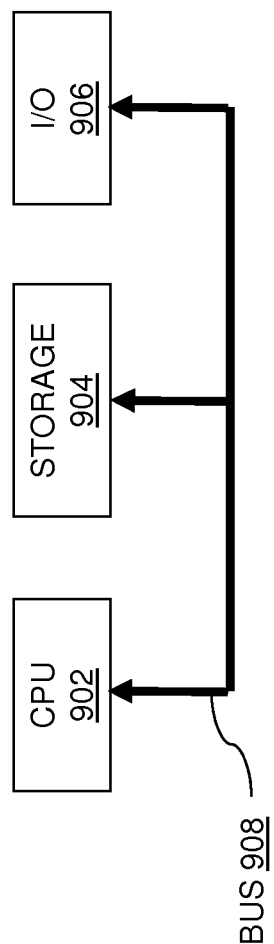
Figure 9: Computer System Modules

IDENTIFYING INTERFERING LINKS IN LOCAL AREA NETWORKS

This application is the U.S. national phase of International Application No. PCT/EP2018/075950 filed Sep. 25, 2018 which designated the U.S. and claims priority to EP Patent Application No. 17195703.8 filed Oct. 10, 2017, the entire contents of each of which are hereby incorporated by reference.

TECHNICAL FIELD

The present invention relates to methods, apparatus and devices for identifying interfering links in a local area network. Preferred embodiments relate in particular to methods, apparatus and devices for identifying and of controlling communications on interfering links in a local area network in which communications are carried using electrical power-supply or "mains" wiring within the local area network premises for at least a portion of a path between a local area network gateway device and one or more user-devices within the local area network, using adapter devices generally referred to as "powerline units".

BACKGROUND

Powerline units are devices which operate according to the "HomePlug" or ITU G.9960, G.9961 (G.hn) standards. They utilise electrical power-supply or "mains" wiring within customer premises to pass data between fixed endpoints in the premises, in scenarios where wireless or Wi-Fi performance is insufficient or unreliable, for example. They generally operate in pairs (but may operate in larger groups), with one unit generally being connected (generally via a short Ethernet cable) to an xDSL/LAN gateway device of the premises and plugged into the mains via a mains socket near the gateway device, and with one or more other units being plugged into a mains socket elsewhere in the premises (as required) and being connected to other devices (printers, smart (i.e. Internet-enabled) televisions, set-top boxes etc.), generally via another short Ethernet cable. Once connected (and once any required "pairing-up" procedure has been performed between the powerline units), the powerline units communicate with each other via the mains wiring to provide seamless communication to their respective end-devices via Ethernet. Current powerline units are capable of Gigabit speeds.

In the above, the collective term xDSL generally refers to any of a variety of types of Digital Subscriber Line (DSL) technologies including ADSL ("Asymmetric" DSL), SDSL ("Symmetric" DSL), ADSL2+(a technique that extends the capability of basic ADSL by doubling the number of downstream channels), VDSL (Very-high-bit-rate DSL), VDSL2 (an improved version of VDSL), and others, such as "G.fast". DSL technologies use modulation schemes to modulate data onto copper wires, and are sometimes referred to as "last-mile" technologies because they are generally used for connections from a telephone switching station such as a local exchange (from which telephony is generally also handled), a street cabinet, or a distribution point to customer premises such as homes or offices, rather than between switching stations.

The term LAN refers to a Local Area Network such as that providing wired and/or wireless connectivity to user-devices within a home, an office, or other such premises, generally via a local area network gateway device which may function as a router and/or modem, and may also provide other functionality in respect of the local area network. There are a variety of ways in which devices within a home or office may be linked to a local area network gateway device, including wirelessly (i.e. using "Wi-Fi"), via a dedicated wired or Ethernet connection, or using paired powerline units which are able to use mains wiring—generally already present in a premises for carrying electricity around the premises—to pass data between fixed devices.

While powerline units are able to provide LAN connectivity, xDSL or broadband delivery to premises (i.e. between an xDSL/LAN gateway device and an Internet Service Provider or ISP) can be susceptible to degradation due to electromagnetic interference and noise. Noise and interference are naturally present in the environment, and xDSL systems are designed to adapt when these are present. Signals from powerline units within a LAN can leak (i.e. be radiated or inducted) into the premises phone-line wiring by which xDSL access is provided to xDSULAN gateway devices, and as powerline units share much of the frequency range with a large range of xDSL technologies and systems, such signal leakage itself has the potential to reduce or otherwise affect xDSL performance (i.e. performance in respect of data communication outside the local area network to/from the gateway device, which can be measured with reference to speed, reliability, variability, error-rate and other types of data communication characteristics). Effects on xDSL performance in respect of the connection to a local area network gateway device may well, as a result, affect the performance of user-devices on any links (i.e. internal wired or wireless links, as well as those via powerline units) within the local area network in question.

This issue has recently been addressed by the powerline industry by the 2016 ITU standard G.9977 (February 2016) entitled "Mitigation of interference between DSL and PLC", available from https://www.itu.int/rec/T-REC-G.9977-201602-I/en. This requires a dialog to take place between powerline units and an xDSL modem under the control of a management entity to determine if there is an impact on xDSL performance from the powerline units, and if so, which spectrum segments (i.e. frequencies or frequency ranges) are involved. The powerline units can then be directed to reduce their transmission power at certain frequencies according to a "policy", based on the outcome of the dialog.

The actual policy to be applied to alleviate possible problems is not defined or specified by the G.9977 standard, which is not ideal for various reasons including the following:

a) The G.9977 standard does not offer a solution that is suitable for managing the increasingly large amount of devices being used. This is partly because the G.9977 standard does not cater for many older devices, many of which are in use but are not capable of G.9977 compliance.

b) Adjustments made simply in accordance with the G.9977 standard have the potential to be service-affecting in particular during a "learning phase", during which a DSL modem may have to cease active connectivity and measure noise on the line in question.

c) The "learning phase" required in order to comply with the G.9977 standard has the potential to be involved and lengthy, based on the number of powerline devices involved and range of spectrum that needs to be examined.

d) Within the principles set out in the G.9977 standard, there are differences in actual implementation, leading to potential fragmentation and incompatibilities.

Referring to prior patent documents, European Patent Application EP2775696 ("BT") relates to a technique for training a DSL link while transmitting data over a powerline connection. If the powerline connection causes interference on the DSL link then this will be present during the line training, giving a more robust set of line parameters.

An ITU-T Draft document entitled "G.hn, G.vdsl, G.fast: Powerline Interference Indication and Mitigation for DSL Transceivers" (Study Period 2013-2016, Study Group 15—Contribution 0175, Ravi Mantri, Metanoia Technologies, AT&T Inc., July 2013) discusses how powerline networking devices based on G.hn operate by transmitting broadband signals over in-house powerline wiring, which may not be designed for data communications, and may cause excessive electromagnetic (EM) emissions from the wiring when the devices are operating. It explains that the emissions can cause interference in other mediums in the vicinity and affect the performance of the devices operating over those mediums. Home-gateway technologies such as VDSL2 and G.FAST rely on broadband communication that shares the same spectrum as the in-house powerline communication network, and are susceptible to a high degree of EM coupling between the networks, resulting in inter-network interference which may lead to instability and errors. The contribution outlines mechanisms that the gateway device and the powerline communication network can follow to mitigate adverse effects from such inter-network interference, and provides implementation details for G.hn and VDSL2, noting that the techniques are also applicable to mitigate interference suffered by G.FAST and other xDSL access technologies.

It is desirable to be able to be able to identify interfering links in a local area network in order to be able to protect or regulate xDSL lines' performance if/when this is affected by powerline units or other devices with a local area network, as this can improve customer experience, but existing solutions for powerline units generally rely on the powerline units being G.9977-compliant and/or rely upon some other proprietary solution, which may rely on an ISP or xDSL/LAN gateway device instructing or interacting with the powerline units themselves. This may itself be particularly problematic as powerline units are generally located physically and topologically within customers' premises and/or other local area networks.

SUMMARY OF THE INVENTION

According to a first aspect of the invention, there is provided a method of identifying and of controlling communications on interfering links in a local area network, the local area network having at least one user-device located therein operable to communicate via a local area network gateway device with one or more remote devices in a communications network outside the local user network, communications being carried via one or more local area network links for at least a portion of a path between the at least one user-device and the local area network gateway device, and being carried via a digital subscriber line for at least a portion of a path between the local area network gateway device and the one or more remote devices, the method comprising:

triggering performance of a signal transmission action on at least one of said local area network links during a predetermined period, the signal transmission action comprising transmission of a signal at a known data flow rate on said at least one local area network link;

monitoring one or more digital subscriber line performance characteristics in respect of data communications on the digital subscriber line during said predetermined period whereby to identify changes in said one or more digital subscriber line performance characteristics; and classifying said at least one local area network link as an interfering link in the event that an identified change in said one or more digital subscriber line performance characteristics coincides with the predetermined period during which said signal transmission action has been performed;

the method further comprising adjusting the data flow rate in respect of data flow on a local area network link in the event that said local area network link is classified as an interfering link.

According to preferred embodiments, the step of triggering performance of a signal transmission action may comprise the local area network gateway device performing an action which causes transmission of a signal at a known data flow rate on said at least one local area network link during said predetermined period.

Alternatively or additionally, the step of triggering performance of a signal transmission action may comprise instructing at least one user-device to perform an action which causes transmission of a signal at a known data flow rate on said at least one local area network link during said predetermined period.

Alternatively or additionally, the step of triggering performance of a signal transmission action may comprise instructing an intermediate signal transmission device on said at least one local area network link to perform an action which causes transmission of a signal at a known data flow rate on said at least one local area network link during said predetermined period.

According to preferred embodiments, the one or more local area network links via which the one or more user-devices located in the local area network are operable to communicate with the local area network gateway device may include at least one local area network link at least a part of which comprises electrical power-supply wiring such as the mains wiring of the premises in question. The one or more local area network links may include at least one local area network link having at least one intermediate signal transmission device, and generally a pair of intermediate signal transmission devices such as powerline devices, arranged to superpose a signal carrying data of the one or more data flows onto electrical power-supply wiring such as the mains wiring of the premises in question. It will be appreciated however that the entity performing the method may perform the steps in question irrespective of knowledge of whether or not any of the local area network links in question comprise electrical power-supply wiring or are links via powerline devices or other such intermediate signal transmission devices. (In the absence of such powerline transmission or such devices, identified changes in digital subscriber line performance characteristics on the digital subscriber line are unlikely to coincide with changes in the data flow rate in respect of data flows on the local area network links, or with the predetermined period during the said signal transmission action has been performed however.)

According to preferred embodiments, the method may further comprise identifying the presence on one or more local area network links of at least one intermediate signal transmission device, and triggering performance of a signal transmission action on said at least one local area network link during a predetermined period.

According to preferred embodiments, the step of monitoring may comprise monitoring one or more digital subscriber line performance characteristics in respect of data communications on the digital subscriber line during said predetermined period whereby to identify changes in said one or more digital subscriber line performance characteristics above a predetermined threshold.

According to preferred embodiments, the step of monitoring one or more digital subscriber line performance characteristics in respect of data communications on the digital subscriber line may comprises monitoring one or more digital subscriber line performance characteristics selected from speed characteristics, reliability characteristics, variability characteristics, stability characteristics and error-rate characteristics. Some specific examples of possible digital subscriber line characteristics which could be monitored include the currently-available access rate, the maximum-attainable rate, the signal-to-noise ratio, the error-correction rate, the current aggregate line-rate, the number or rate of errored seconds, or the number or rate of "cyclic redundancy check" (CRC) errors (which are an indication that there might be excessive noise on the line). Other characteristics may also be chosen.

According to preferred embodiments, the method may comprise triggering performance of a plurality of signal transmission actions on said at least one local area network link during different predetermined periods, the signal transmission actions comprising transmissions of signals at different known data flow rates on said at least one local area network link, monitoring one or more digital subscriber line performance characteristics in respect of data communications on the digital subscriber line during said predetermined periods whereby to identify changes in said one or more digital subscriber line performance characteristics during said predetermined periods, classifying said at least one local area network link as an interfering link at one of said predetermined data flow rates in the event that an identified change in said one or more digital subscriber line performance characteristics coincides with the predetermined period during which said signal transmission action at said predetermined data flow rate has been performed.

Preferably, methods according to such embodiments may further comprise identifying a data flow rate below which said local area network link is not classified as an interfering link.

According to preferred embodiments, one or more of the steps of triggering performance of a signal transmission action, monitoring one or more digital subscriber line performance characteristics in respect of data communications on the digital subscriber line, and classifying said at least one local area network link may be performed by or under the control of the local area network gateway device. Alternatively, one or more of the steps may be performed by or under the control of a local control module associated therewith, or by or under the control of a remote control module.

According to preferred embodiments, the method may comprise limiting the data flow rate in respect of data flows on a local area network link classified as an interfering link to a data flow rate at which said local area network link is not classified as an interfering link.

The adjusting of the data flow rate may involve simply throttling the data flow rate on the link or links in question, or (temporarily) buffering data then transmitting (or re-transmitting) the data on the local area network link(s) in question later, thereby effectively smoothing out peaks in the data rate on the link(s) in question, or may involve implementing a "random discard" or other such "dropping" or re-directing process or algorithm either within or separate to the data transport protocol being used for data transport on the link(s) in question, possibly to encourage a stream to adopt a lower rate. The manner in which the adjusting of the data flow rate is performed on the link(s) in question may therefore depend on the Transport Layer protocol being used for the data transport for the flow in question on the link(s) in question between the local area network gateway device and the user-device(s) in question. The Transport Layer protocol may be the Transmission Control Protocol (TCP), the User Datagram Protocol (UDP) or another protocol.

The adjusting of the data flow rate on the link or links in question (whether it involves throttling the data rate, temporarily buffering data, dropping data units or another type of adjusting) may be performed by or at the local area network gateway device, or possibly by or at the user-device(s) in question, possibly by a module associated with the local area network gateway device and/or the user-device(s) in question.

According to a second aspect of the invention, there is provided apparatus for identifying and for controlling communications on interfering links in a local area network, the local area network having at least one user-device located therein operable to communicate via a local area network gateway device with one or more remote devices in a communications network outside the local user network, communications being carried via one or more local area network links for at least a portion of a path between the at least one user-device and the local area network gateway device, and being carried via a digital subscriber line for at least a portion of a path between the local area network gateway device and the one or more remote devices, the apparatus comprising one or more processors configured to:
  trigger performance of a signal transmission action on at least one of said local area network links during a predetermined period, the signal transmission action comprising transmission of a signal at a known data flow rate on said at least one local area network link;
  monitor one or more digital subscriber line performance characteristics in respect of data communications on the digital subscriber line during said predetermined period whereby to identify changes in said one or more digital subscriber line performance characteristics; and
  classify said at least one local area network link as an interfering link in the event that an identified change in said one or more digital subscriber line performance characteristics coincides with the predetermined period during which said signal transmission action has been performed; and
  adjust the data flow rate in respect of data flows on a local area network link in the event that said local area network link is classified as an interfering link.

Apparatus according to the second aspect may be associated with or comprised as a part of a local area network gateway device.

According to a third aspect of the invention, there is provided a computer program element comprising computer program code to, when loaded into a computer system and executed thereon, cause the computer to perform the steps of a method according to the first aspect.

The various options and preferred embodiments referred to above in relation to the first aspect are also applicable in relation to the second, third, fourth and fifth aspects.

It will be noted that the functionality for performing methods according to preferred embodiments could be implemented by means of software updates to existing xDSL/LAN gateway devices or could be included as part of the firmware build of new devices.

BRIEF DESCRIPTION OF THE DRAWINGS

Preferred embodiments of the present invention will be described with reference to the appended drawings, in which:

FIG. 1 illustrates various ways in which user-devices within a local area network may be in communication with a local area network gateway device, and via that with external networks and with devices in external networks;

FIG. 2 indicates how VDSL degradation may be related to powerline traffic rate;

FIG. 3 illustrates functional modules which may be present in a Local Area Network Gateway Device configured to monitor and control communications in respect of a Local Area Network;

FIG. 4 illustrates a method that may be performed when monitoring and controlling communications in respect of a Local Area Network;

FIG. 5 illustrates functional modules which may be present in or associated with a Local Area Network Gateway Device configured to perform a method according to a preferred embodiment;

FIGS. 6, 7 and 8 illustrate methods that may be performed by modules of or associated with a Local Area Network Gateway Device when performing a method according to a preferred embodiment; and FIG. 9 is a block diagram of a computer system suitable for use in performing methods according to preferred embodiments of the invention.

DESCRIPTION OF PREFERRED EMBODIMENTS OF THE INVENTION

With reference to the accompanying figures, a method according to a preferred embodiment and associated systems and apparatus will be described primarily with reference to FIGS. 5, 6, 7 and 8. Firstly however, a scenario in which user-devices within a local area network may be in communication with a local area network gateway device in various ways, including via powerline units, will be described with reference to FIG. 1, an explanation of how VDSL degradation may be related to powerline traffic rate will be provided with reference to FIG. 2, and a technique for monitoring (essentially "passively") and controlling communications in respect of a Local Area Network will be provided with reference to FIGS. 3 and 4, in order to assist with the subsequent explanation of a preferred embodiment, which involves what can be regarded as "active" monitoring.

FIG. 1 shows a Local Area Network or LAN 20 within which various user-devices, which may be temporarily or permanently based in a local area or building such as a home, office or other premises, may be or are being used to communicate with servers and/or other devices in networks outside the LAN (and therefore generally outside the local area or premises) via external networks such as an access network 15 of an Internet Services Provider (ISP), a core network, the Internet 10 or other networks, and/or with other platforms, networks etc. While the Internet 10 and an ISP network 15 are shown, this figure is primarily intended to illustrate various ways in which user-devices within the local area network 20 may be in communication with a local area network gateway device 30, and thus with external networks and with devices in or connected to such external networks via the xDSL/LAN gateway device 30.

The LAN 20 itself is represented in FIG. 1 by a "dot-dash" rectangle. It will be appreciated that the LAN 20 would not generally have a strictly-defined physical boundary, let alone be rectangular in shape—its physical extent would be dependent on where user-devices would be able to be located while still being able to communicate via a wired or wireless connection with the xDSL/LAN gateway device 30.

To avoid unnecessary clutter, the premises itself and its physical boundaries (walls, etc.) are not shown separately, but for the purposes of this example, the "dot-dash" line indicating the extent of the LAN may be thought of as corresponding approximately to the extent of the premises.

The xDSL/LAN gateway device 30, which will be discussed in more detail later with reference to FIG. 3, is a device having various functional modules including a modem 31, which serves as or is linked to an external or Wide Area Network (WAN) interface, and one or more local area network interfaces, in this case an internal Ethernet interface 38 for wired/Ethernet connections to user-devices within the premises via dedicated wired or Ethernet connections or otherwise, and an internal wireless (or "Wi-Fi") interface 39 having an antenna 39a for communicating wirelessly with user-devices. The xDSL/LAN gateway device 30 would generally also include a memory and a processor for performing processing related to routing and other functions. These are not shown to avoid unnecessary clutter, but the routing of data between the modem 31 and the internal interfaces 38, 39 is represented by dotted lines within the xDSL/LAN gateway device 30.

The xDSL/LAN gateway device 30 is in communication with the ISP network 15 (and hence with other external networks such as the Internet 10 and other networks) via an xDSL link 19, which in this case is shown as a VDSL link over a twisted copper-pair subscriber-line to a street-cabinet or distribution point (DP). (NB The acronym "DP" is sometimes also used to refer to a 'drop point', and the distribution point may in fact be a drop point, but in general, where the acronym "DP" is used here, it will be used to refer to the term "distribution point", whether this is a drop point or otherwise). In general, the xDSL connection comprises a copper subscriber line extending between two xDSL modems, one being the modem 31 in the xDSL/LAN gateway device 30, and the other being located in the street cabinet or DP, or (in the case of ADSL) at the local exchange (known as the 'central office' in US terminology). Typically, the local exchange, street cabinet or distribution point includes a DSL Access Multiplexer or "DSLAM" (a form of aggregation transceiver device, not shown) comprising several DSL modems (one for each subscriber line) or equivalent device, depending on the type or types of xDSL involved. The DSLAM (at the exchange, cabinet or distribution point) connects the first DSL modem at the customer's premises to the ISP, access or core network, typically over a faster optical fibre connection.

By virtue of the internal interfaces, there are a variety of ways in which devices within the premises may be linked to the xDSL/LAN gateway device 30, including wirelessly (i.e. using "Wi-Fi"), via a dedicated wired or Ethernet connection, or using paired powerline units which are able to use mains wiring—generally already present in a premises for carrying electricity around the premises—to pass data between fixed devices.

In FIG. 1, four different types of user-device are shown in the premises covered by the LAN 20, namely a handheld or "tablet-style" wireless-enabled computing device or mobile smart-phone 22, a wireless-enabled laptop computer 23, a desktop computer 24 and an Internet-enabled television 25. The desktop computer 24 and television 25 may be wireless-capable, but for the purpose of the present example will be regarded as having Ethernet connectivity in order to illustrate relevant concepts as clearly as possible.

The mobile or tablet device 22 and the laptop device 23 are shown as being connected wirelessly to the xDSULAN gateway device 30 via the wireless interface 39.

The desktop computer 24 is shown as being connected to the xDSL/LAN gateway device 30 via a wired/Ethernet connection 28d to the Ethernet interface 38 of the xDSULAN gateway device 30.

Also represented in FIG. 1 is the electrical supply or mains wiring 26 for the premises. While each electrical device would generally need to be connected to the mains wiring 26 at least temporarily (to re-charge) or while being used, electrical connections are only shown to some of the devices, in particular an electrical connection 26d to the desktop computer 24, an electrical connection 26c to the television 25, and electrical connections 26a and 26b respectively to each of a pair of powerline units 27a and 27b, one of which (powerline unit 27a) is located close to the xDSULAN gateway device 30 and the other of which (powerline unit 27b) is located close to the television 25.

For its network or data connectivity (as opposed to its electrical power supply connection), the television 25 is shown as being connected via a wired/Ethernet connection 28b to the powerline unit 27b, which is connected via the mains wiring 26 to the powerline unit 27a with which it forms a pair, and with which it is therefore able to exchange data via the mains wiring 26. Powerline unit 27a is shown as being connected via a wired/Ethernet connection 28a to Ethernet interface 38 of the xDSULAN gateway device 30.

As a result of the connection via the pair of powerline units 27a, 27b, television 25 is in communication with xDSL/LAN gateway device 30 via the mains wiring 26 of the premises. It will be noted however that the direct connections to the television 25 and the xDSULAN gateway device 30 are normal Ethernet connections, and neither the television 25 nor the xDSL/LAN gateway device 30 need to function in a different manner on account of the fact that the communication between them happens (in part) over the mains wiring 26 of the premises—both may simply function as if the communication between them is happening simply via a normal Ethernet connection. Essentially, neither the television 25 nor the xDSL/LAN gateway device 30 even needs to be "aware" that the communication between them is happening (in part) over the mains wiring 26.

As previously mentioned, powerline devices and xDSL systems share similar frequency spectrum and the previous and current approach to mitigate the effect of powerline interference has generally been to reduce the transmit power if it is determined from a dialog between the powerline units and an xDSL modem that the powerline units are having an impact on the xDSL performance to the xDSL modem (i.e. the external performance on the xDSL link between the xDSL modem and the local exchange, the street cabinet or the distribution point). However, powerline signalling is essentially based on time division multiplex signalling, where the amount of time it takes to transmit is dependent on the traffic load over a given link in the LAN and/or the premises (i.e. a network connection between the xDSL/LAN gateway device, which may be in the hall of a house, for example, and a user-device such as a television elsewhere in the house, the connection being made using a pair of powerline devices). Although the power emitted and the frequency range used by the powerline devices is generally fixed, the effective period that they transmit is generally variable.

The inventors have established that the relationship between traffic load and damage to xDSL (for any given level of interference) is related to traffic levels (i.e. the LAN data rate between the powerline devices, or "throughput"). This is illustrated by the graph in FIG. 2, which shows (specifically in the specific case of a VDSL2 link over a 1600 m line with powerline interference occurring over the last 15 m) that VDSL degradation is related to powerline traffic rate. The spike(s) in the graph at around 65-70 Mbps suggest that the VDSL link needed to retrain due to the powerline traffic.

In view of this, the inventors have established that this relationship between LAN traffic rate (i.e. internally) and damage to broadband performance to the LAN from outside (which itself will have a resulting effect on the internal LAN performance as well, of course) allows the xDSL/LAN gateway device itself to be able to detect and monitor whether xDSL performance is being affected by interference from powerline devices within the LAN, and therefore allows the xDSL/LAN gateway device itself to identify interfering links. Based on this, it may then control internal LAN communications in order to mitigate the effects of such interference. In other words, the impact on xDSL performance of powerline signal leakage is related to the level (i.e. data flow rate) of traffic through those powerline units, as well as to their transmission power.

Based on this, the inventors have identified techniques which are the subject of a patent application filed on 28 Sep. 2017 and which remain unpublished on the date of filing of the present application, but which will be summarised here in order to assist with the subsequent explanation of embodiments of the present invention. Briefly, the techniques which are the subject of the earlier (unpublished) patent application involve determining (using what may be regarded as a "passive" monitoring technique) if observed changes in communication characteristics (i.e. error rate increases, line-rate reductions or changes in other performance metrics) on an xDSL line appear to coincide with observed changes (i.e. generally, increases, but possibly decreases) in the data flow rate on one or more LAN links within the premises. If so, while the xDSL/LAN gateway device may essentially be "unaware" that communications on those internal LAN links are happening via powerline units and the mains wiring, it is unlikely that such coincident changes would occur otherwise, as other communications within a LAN would not generally take place using transmission frequencies that would cause interference at such coincident times, so it can be inferred by the xDSL/LAN gateway device (without the need for any dialog with the powerline units) that the xDSL changes are (almost certainly) being caused by coincident powerline signal leakage. The xDSL/LAN gateway device can thus react by applying traffic flow control on the LAN link(s) in question if/when appropriate in order to protect the xDSL performance to the premises. Such traffic flow control may involve reducing the data flow rate on the LAN link(s) concerned, for example, rather than simply reducing the power used for transmissions used on those links as would happen according to the G.9977 standard.

Since xDSULAN gateway devices are generally provided to customers by their ISPs, this allows ISPs to provide suitably configured or modified xDSULAN gateway devices to their customers which will be able to minimise or regulate the impact on xDSL performance of any powerline units that the customers are using in their LANs, which those ISPs may well not own or control and/or with which those ISPs may be unable to communicate. Further, any such regulation of the impact on xDSL performance of any powerline units in a LAN may be based on a desired or specified xDSL/LAN performance balance, rather than on a (possibly arbitrary) spectral power level specified in the G.9977 standard, for example).

Such techniques allow policies to be applied in order to regulate the behaviour of the xDSL/LAN gateway devices in question, and hence the effect on them of any powerline devices within the LANs in respect of which they are acting. Such policies may be pre-set or configured by ISPs on behalf of their customers, or may be configured by the customers themselves, possibly based on a default setting.

There now follows a detailed methodology by which such ("passive") monitoring and adjustment may be performed. Such a method may be performed by an xDSULAN gateway device in a scenario such as that shown in FIG. 1, but the more detailed processing according to such a technique will refer to the more detailed diagram of a suitably configured or modified xDSL/LAN gateway device shown in FIG. 3.

FIG. 3 shows the architecture of an xDSULAN gateway device for a LAN such as a home LAN, which is similar to that shown in FIG. 1 but also shows additional functional modules enabling it to perform a method according to such a ("passive") technique and thereby protect the xDSL connection.

As before, the xDSULAN gateway device 30 is shown as having a modem 31 from which it is linked via an xDSL link 19 to an ISP network (not shown in FIG. 3), and as before, is shown as having a LAN/Ethernet interface 38 for wired/Ethernet connections to user-devices within the premises, and a wireless interface 39 for communicating wirelessly with user-devices (although the wireless interface is not of particular relevance for the purpose of the present explanation, so will not be discussed further). Also as before, a television 25 is shown, again communicating with the Ethernet interface 38 of xDSL/LAN gateway device 30 via a pair of powerline devices 27a and 27b over the mains wiring 26, the powerline devices 27a and 27b having respective Ethernet connections 28a and 28b. In FIG. 3, the television 25 is shown as having a separate set-top box (STB) 25a into which Ethernet connection 28b is plugged, but this is arbitrary—some televisions may have the functionality provided an STB themselves.

Additional functional modules are shown, namely a flow analyser 32, a flow controller 33, an impact analyser 35 and a policy store 37.

For the sake of simplicity, an example will be considered in which a single default policy (stored in the policy store 37, for example) is present, specifying for example that a given xDSL rate (one that the customer is paying for, for example) should be met, but it will be appreciated that in other examples, more than one policy may be available, or the policy may be changed by the customer or by the ISP (as symbolised by the arrow from the ISP). Even such a simple policy may have a big impact, however. In the case of a VDSL home (for example) where the customer is paying for a 30 Mbps service but the VDSL connection is generally achieving 50 Mbps, then an impact of up to 20 Mbps could be accommodated without issue. If however a customer paying for the same 30 Mbps service is actually receiving 33 Mbps to the home, then very little degradation due to powerline ingress can be accepted, and a low traffic rate in the home (over the powerline links, and over other links within the LAN, such as Wi-Fi) may result.

The policy may change if it becomes clear that communication within the LAN is significantly or severely affecting access speed to the LAN. In this case a policy may be used which expresses or reflects a balance of access and LAN connectivity agreed with the customer in question. For homes on short loop lengths there will probably not be any significant effect from powerline devices in the home. In the case of long lines, the link to the access network may become unstable above a certain speed, so regulating it to a cap a safe level below that (20% below, for example) would generally provide a good balance between xDSL and LAN performance. In such a case, this would be the set policy. There may also be multiple polices ensuring a prioritised action, such as might occur if there were multiple powerline links in a home. For present purposes, we will consider a simple single-endpoint policy.

Referring again to FIG. 3, the xDSL modem 30 provides updates (shown as "xDSL metrics") on the performance of the xDSL line 19. The type of updates may depend on the type of xDSL technology being employed. For VDSL, they may be (or include) one or more of the currently-available access rate, the maximum-attainable rate, signal-to-noise (SNR) data, error correction data, etc., for example. Other metrics such as the current aggregate line-rate may be used instead or as well.

The flow analyser 32 captures information on all the distinct flows (separate IP connections, for example) through the gateway device 30. These may be expressed as source/destination IP addresses. It may provide updates on a regular basis, every second, for example. The flow analyser 32 may also aggregate flows for a given home endpoint address, which represents an end user-device, for example. For instance, if the set-top box (STB) 25a in FIG. 3 (connected via the pair of powerline devices 27a and 27b) was recording as well as processing a live stream there would generally be two distinct flows, but the flow analyser 32 may aggregate these and report them as if they were one.

The flow controller 33 may take a tuple of home destination IP address and the rate required. In this example, one device and one flow are considered, but a more complex scheme might split device flows, if the policy has sufficient granularity. The flow controller 33 may apply control in various different ways, as will become apparent. It may buffer data to re-transmit after a peak, or may employ a "random discard" process or algorithm to encourage a stream to adopt a lower rate, or may employ additional TCP flow control by delaying/dropping packets, for example.

The Impact Analyser (IA) 35 is in communication with the modem 31 (from which it receives updates on the xDSL metrics) as well as with the flow analyser 32 (from which it receives updates on the LAN flows), with the flow controller 33 (to which it may provide instructions as to whether and how to control the LAN flows) and with the policy store 37. In this example, the Impact Analyser 35 takes the given policy and assesses if any flow (or combination of flows) is impacting the xDSL signal above a policy limit, doing so by observing whether there is a correlation between the times of observed changes in communication characteristics on the xDSL line and the times of observed changes in the data flow rate on one or more of the LAN links within the premises. If there are, the Impact Analyser 35 issues a flow control action. It may also issue an alert to the ISP (symbolised by the dotted arrow). It will be noted that a default policy might be to detect (or infer) the presence of powerline ingress and raise this as a log/alert for a helpdesk agent if a customer reports a fault, allowing instructions relating to any flow control then deemed to be appropriate in respect of any LAN flows to be provided from the ISP or elsewhere. In this case the additional modules within the xDSULAN gateway device may perhaps be reduced to a flow analyser 32 and an Impact Analyser 35.

Returning to the example of FIG. 3, the Impact Analyser 35 may monitor the effectiveness of the flow control action. Depending on the policy, it may issue further flow control actions and/or alerts if the policy still cannot be met (i.e. a new policy may then be discussed with the customer and applied). This facility is beneficial as the conditions within the customer's home may change and capturing this situation may be an important additional improvement.

The detailed operation of the Impact Analyser 35 according to such a ("passive") technique is depicted in FIG. 4, which illustrates how the analysis process may be performed. It will be appreciated that other approaches may be used to perform the analysis and provide the resulting flow control.

From a start point indicated by s40, the process may run continuously or may be triggered when an xDSL update is received. A number of thresholds may be used to provide a suitable level of sensitivity to its operation. These will be discussed in more detail below, after an explanation of the overall process.

At step s41, the Impact Analyser 35 waits for xDSL metric updates. Receipt of these triggers the process to move to step s42.

At step s42, it is established whether the received metrics indicate a significant change (based on a first threshold, T1). If so, this indicates that some action should be taken. For a significant degradation in xDSL performance, the process proceeds via steps s49, s50, s51, s52, s53 and s54 before returning to step s41 via step s48. For a significant improvement in xDSL performance, the process proceeds via steps s43, s44, s45, s46 and s47 before returning to step s41 via step s48. It should be noted that the check made at step s42 may also consider longer-term drift as well as significant step-changes in xDSL performance.

Looking first at the process and path if it is found at step s42 that there has been a significant degradation in xDSL performance, individual LAN flows may be considered in turn.

At step s49, the updates for the first (and subsequently, each other known) LAN flow under consideration are loaded (although flows that have previously been marked as known not to have an impact on xDSL performance may be skipped). For each known flow under consideration, it is ascertained at step s50 whether or not the flow's rate (or another such flow metric) has increased by a significant amount (based on a threshold T4). If the flow has not increased by a significant amount, and if it is found at step s53 that there is another flow to be considered, the process returns to step s49 and updates for the next flow are loaded. If there are no more flows to be considered, the current xDSL metrics are cached (step s48), and the process returns to step s41.

If it is ascertained at step s50 that the flow's rate (or other such flow metric) has increased by a significant amount (based on the threshold T4), the process continues to step s51.

At step s51, a table that holds records of flows with a significant impact is updated. This step may involve entering a new flow into the table or updating the record in respect of an existing flow. An existing flow may have an averaging process applied or longer term statistics may be used to determine its impact. The dependency may be expressed in Mbps per change in xDSL performance/Mbps per change in LAN flow rate, and may be accumulated for each flow from/to a device in the premises.

It is then established at step s52 if the currently-implemented policy has been breached (which may happen at any point in such an iterative process). If the policy has not been breached, the process proceeds via steps s53 and s49 and other flows are considered until all have been, at which point, the current xDSL metrics are cached (step s48), and the process returns to step s41.

If it is established at step s52 that the policy has been breached, the process proceeds to step s54 and the flow controller 33 (shown in FIG. 3) is instructed to apply control. The instructions specify the local end-point (i.e. the destination IP address of the LAN link in question) and the level of restriction to apply.

Referring in more details to step s54, reached if it is established at step s52 that the policy has been breached and that action should be taken to apply flow in respect of the LAN link in question (which can be assumed to be a LAN link involving powerline devices which is causing interference affecting the xDSL performance), there are a number of decisions (not shown in the flow-chart) which may be taken. Firstly, if this is the first time it has been deemed appropriate to take action in respect of a particular flow, flow control may be applied in a default manner. If it is found that this is a repeat report or instruction in respect of the same flow, it may be that there has been a delay in implementing previously-instructed flow control, so further action may be skipped. If however this is a repeat report for the flow and a suitable period of assessment has expired, this may be taken to indicate that the learning process being used is not accurate, and a reset command may be issued in respect of the table holding records of flows recorded as having a significant impact. This does not necessarily indicate an error but may occur naturally as conditions in the premises in question may have changed. If this is found to be the case, the process of checking the flows may be halted and the process may return to step s41 via step s48, at which the current xDSL metrics may be cached.

Looking now at the process and path if it is established from received xDSL updates that there has been a significant improvement in xDSL performance, the process first proceeds to step s43.

At step s43, an assessment is made as to whether the LAN traffic flow rate has dropped by a significant threshold amount T2 (or alternatively has dropped below a threshold T2'). A primary aim of this branch of the process may also be to look for critical flows indicated by a decrease in ingress/interference. If the LAN traffic is down by the threshold amount T2 (or has dropped below a threshold T2'), it can be inferred that at least one flow is causing this.

At step s44, the updates for the first (and subsequently, each other known) LAN flow under consideration are loaded At step s45, a determination is made as to whether the flow's rate (or another such flow metric) has reduced by a threshold amount T3.

If the flow rate has not reduced by the threshold amount T3, and if it is found at step s47 that there is another flow to be considered, the process returns to step s44 and updates for the next flow are loaded. If there are no more flows to be considered, the current xDSL metrics are cached (step s48), and the process returns to step s41.

If it is ascertained at step s45 that the flow's rate (or other such flow metric) has reduced by the threshold amount T3, the process continues to step s46.

At step s46, the flow deemed to be having a significant impact has been identified, so the table holding records of flows with a significant impact is updated. As before, this may involve recording a tuple of the LAN link end-point and flow rate. This check should pick up and confirm the actions of previous flow controls, and may also enter new flows. It may also apply longer-term averaging as used in the counterpart update action of step s51.

If it is then found at step s47 that there are no other flows to be considered, the current xDSL metrics are cached (step s48), and the process returns to step s41.

As explained before, a longer-term view of the metrics may be employed to detect whether a gradual drift is present as well as to detect significant step-changes in xDSL performance.

Turning to the various thresholds discussed above, these may be chosen according to the requirements of the system in question, but the following suggested thresholds may be used:

The threshold T1 for assessing the amount of change in xDSL performance in step s41 may be set at a level to trigger action only on a 5% (or greater) deviation in xDSL metrics, for example, ensuring that only major changes therein will lead to the additional processing starting from step s49. For VDSL this might also include a retrain event, for example. As mentioned earlier, this may also include a percentage drift from the last significant rate event, such as a retrain or G.fast initial rate.

The threshold T2 for assessing the amount the LAN traffic rate has decreased in step s43 may be set at a level to trigger action only on a 5% (or greater) deviation in traffic rate, for example, similarly ensuring that only significant changes will lead to the additional processing starting from step s44 to find a possible correlation with a flow increase. If no correlation is found, it may be inferred that the observed decrease in LAN traffic rate may have been due to a 'natural' noise event, so does not necessarily indicate an error.

Thresholds T3 & T4 are provided to ensure that action is only taken on the basis of a reasonable amount of change in LAN flow rate, which may be of the order of 1% or a few percent. The thresholds would generally be much smaller than thresholds T1 and T2 since these represent changes across the entire interface, whereas thresholds T3 and T4 are generally applied only in respect of traffic rates on individual LAN links to individual end-devices.

Active Monitoring to Identify Interfering Links

Where techniques such as those discussed above would generally involve (essentially passive) monitoring of performance on an xDSL line and of data-rate on LAN links which may involve transmission via powerline devices, comparison to see if changes (in particular, deterioration) in xDSL performance coincide with changes (in particular, increases) in LAN flow data-rates, and action if so, preferred embodiments may involve the xDSL/LAN gateway device or an associated device actively triggering signals (which may comprise actual data which is required by or desired to be sent by a user-device, or may comprise dedicated test signals, or may comprise randomly-generated signals) to be carried on LAN links which may involve transmission via powerline devices, and monitoring the effects on the xDSL line of such signals being transmitted in order to establish whether this has an appreciable coincident effect on the xDSL performance (i.e. an effect coinciding with the period during which a signal is being transmitted at a particular flow-rate on the LAN link or links in question which appears to cause the performance on the xDSL line to become degraded below or beyond a given threshold). According to preferred embodiments, such a process (which may be regarded as involving "active" monitoring) may be performed in conjunction with or instead of the techniques referred to above as "passive".

Preferred embodiments may involve active detection of powerline devices or other such potentially-interfering devices within a premises which might cause LAN links they are on to interfere with an external xDSL line, which may enable such "active" monitoring to target potentially-interfering devices on any such potentially-interfering links, but it will be noted that as with the "passive" techniques described above, actual "knowledge" that such potentially-interfering devices are present may not be necessary—an entity such as an xDSL/LAN gateway device performing a method according to a preferred embodiment may perform the method irrespective of such "knowledge" and still be able to identify an interfering link (thereby inferring without actual confirmation that one or more such potentially-interfering devices are present).

Detection of potentially-interfering devices such as powerline devices may be by way of Ethernet frames transmitted from the xDSL/LAN gateway device over an Ethernet connection composed as a published powerline management format frame. The capabilities of published powerline management format frames are limited (irrespective of the powerline technology). Preferred embodiments may use a common capability across powerline technologies or a range thereof for eliciting a response from an Ethernet-connected powerline device.

Such a response may be sufficient to determine the presence of a powerline network, even if the existence of only one device is confirmed. Preferred embodiments may then act as if any traffic flow through the xDSL/LAN gateway device (via its Ethernet ports) has the possibility of flowing via a powerline device (or pair of powerline devices). On this basis, preferred embodiments then probe each client end-point with a traffic burst (a signal which may simply be a predetermined signal, noise or other such data) to establish if deterioration in xDSL performance coincides with the traffic burst. The traffic rate used in the burst may vary, and a number of bursts may be sent to better characterise the impact on the xDSL performance. The probes for detecting powerline devices in the LAN may be sent out at regular intervals.

Upon first detection of a powerline device (or upon their re-detection, as discussed below), the traffic bursting capability is activated and as a result active flow management may occur. If a previously-detected powerline device ceases to respond to a probe, it may be assumed that it has been removed or has entered a "sleep" state. In either case, active flow control management may be disabled. When traffic bursting is activated, no action need be taken until a new LAN source address is detected (i.e. when a DHCP request is made to the gateway). At this point (i.e. once the presence of a powerline device is established, and a new end-point is detected, and it originated over Ethernet or possibly another LAN interface) one or more traffic bursts are sent to characterise the potential or actual impact on performance on the xDSL link. If further end-points are discovered, the process may be repeated. When a powerline device ceases to respond to a probe, the characterisation for the associated end-points may also be cleared. If/when the presence of a powerline device is confirmed, the process may be repeated.

NB Generally, such detection of powerline devices will be over Ethernet, but it is possible that such devices may be attached at the end of a Wi-Fi bridge, for example. In such cases, probes could be sent over Wi-Fi as well as or instead of over Ethernet interfaces. Whichever interfaces receive probe responses would generally pick up associated DHCP requests.

Referring to FIG. 5, this shows the architecture of an xDSL/LAN gateway device 50 for a LAN such as a home LAN, which is similar in some ways to the xDSL/LAN gateway device 30 shown in FIGS. 1 and 3 but which may (additionally or instead) perform functionality in order to perform a method according to such an "active" embodiment. Some of the components such as the modem 31 and the interfaces 38, 39 may perform the same or essentially the same functions as those in the xDSULAN gateway device 30, as may other entities with which the xDSL/LAN gateway device interacts such as the xDSL line 19 and the user devices 25. These components and entities are therefore given the same reference numerals as in FIGS. 1 and/or 3, and their functionality will not be discussed again in detail here. The following discussion will relate primarily to the additional or alternative functionality specific to preferred embodiments capable of performing such active monitoring.

The high-level interactions involved in such active monitoring according to a preferred embodiment are as follows.

The primary active component by virtue of which the xDSL/LAN gateway device 50 in the present embodiment differs from the xDSULAN gateway device 30 discussed with reference to FIG. 3 is the powerline detector 52. While this may also perform functionality such as that of the flow analyser 32 in FIG. 3, the powerline detector 52 in the present embodiment sends probes (i.e. probe signals), preferably at regular intervals on the Ethernet, and receives responses for any local devices (e.g. powerline device and other devices in the LAN). A status update is sent to the impact analyser 55 and flow controller 53 every time the status changes (e.g. if a powerline device has responded for a first time, an 'active' status update may be sent; if a device has been present but is no longer responding, 'in-active' status update may be sent).

The Impact Analyser 55 and Flow Controller 53 may also perform functionality such as that of the Impact Analyser 35 and Flow Controller 33 in FIG. 3, but in the present embodiment, these modules also perform the following. When in "active" mode, the Impact Analyser 55 determines if any new LAN source (IP address) induces a degradation in xDSL performance. It does this by instructing the Flow Controller 53 to send a burst of traffic to the new LAN source whilst observing the effect on xDSL performance. The Impact Analyser 55 may apply several differing bursts of traffic either to determine that traffic to/from the new source address has no appreciable impact, or to determine the point at which an appreciable or unacceptable impact is encountered. When this occurs the Impact Analyser 55 may instruct the Flow Controller 53 to apply regulation at a specified traffic rate, based on the results of the analysis, in order to restrict the flow-rate of actual data flows between the xDSL/LAN gateway device 50 and any user-device 25 communicating via the powerline devices 27 and the links 26, 28 in question to flow-rates below flow-rates at which an appreciable or unacceptable impact was caused during active monitoring.

Where two or more LAN client devices have been observed to induce harmful impact on the xDSL performance, the Impact Analyser 55 may apply compound traffic bursts to determine the net effect of one or more concurrently-signalling clients. In this case the Flow Controller 53 may be given a compound regulation instruction.

The Flow Controller 53 waits until an "active" event status is sent from the powerline detector 52. At this point it initiates two processes, which may proceed concurrently.

The first process involves monitoring flow rates across the LAN/Ethernet interface 38 for any LAN clients that have been noted as requiring regulation. When this occurs the Flow Controller 53 may accumulate the current rate for each LAN client to see if it is within a specified margin of the given regulation. Similarly, compound regulation and breaches of policy may be considered. Any regulation to be applied is actioned in the Flow Controller 53.

The second process involves taking regulation requests from the Impact Analyser 55 and providing new flow indications. When the powerline detector 52 indicates that a new powerline device 27 is present, both processes may stop and any current regulation may be reset.

Possible processes that may be performed by modules within the xDSULAN gateway device 50 of FIG. 5 such as the powerline detector 52, the Impact Analyser 55 and the Flow Controller 53 during the performance of a method according to an "active" embodiment such as that described above are shown in FIGS. 6, 7 and 8.

Referring to FIG. 6, this illustrates an example of a process which may be performed by the powerline detector 52 in FIG. 5. This module has knowledge of or access to the Ethernet frame formats for all of the families of powerline devices—they may be stored in a format store 604, for example. It may also have vendor specific knowledge. When the xDSL/LAN gateway device 50 is powered up this process starts, and may run continuously. When started (step s60) the detector waits (step s61), then loads the first Ethernet frame probe (step s62) and sends it (step s63), then looks for a known response (step s64). If a response is present, the status is checked (step s65). If the status was previously inactive an active status event is emitted to the Impact Analyser 55 and the Flow Controller 53 for the device in question (step s66).

If no response is present from the Ethernet frame probe (and it is not the last), the next Ethernet frame probe is loaded (step s62) and sent as before. The process continues until the last frame has been sent (step s67). If no response has been found and the device in question was previously active (step s68), then an inactive status event is emitted (step s69).

Referring to FIG. 7, this illustrates an example of a process which may be performed by the Impact Analyser 55 in FIG. 5.

This waits (step s700) until an event occurs (step s700). If it is found at step s705 that this is an "inactive" event (i.e. an "inactive" status update), it ceases activity (step s707). If it is found at step s705 that this is an active event (i.e. an "active" status update), the module measures and logs the xDSL metrics (step s710) and loads the first burst information (step s715), which may be stored in a format store 704, for example. This will generally include a rate, duration and specified method.

To assess the link, a given amount of traffic is directed to the client device—it is not necessary to set up a connection or dialog with it. As such a suitable method might be a 'flood ping', configured to the required rate. If the user-device replies to the ping, the additional traffic generation should be taken into account. If the user-device firewall blocks the ping, the traffic assessment rate may rely solely on the ping transmit configuration. Such an action may result from a request being issued to the Flow Controller 53 in step s717. After the duration of the burst has passed, the xDSL metrics are sampled again (step s720). If a threshold T1 is not exceeded (step s725), and it is not the last burst (step 745), the process returns to step s710. If a threshold T1 is exceeded (step s725) then a regulation request is generated and sent to the Flow Controller 53 (step s730). Either way, at this point, the new source may be considered in conjunction with (possible) other known LAN sources (steps s735, s740). For this, concurrent burst rates may be sent to the two or more LAN client devices in question and the impact measured. This may result in a compound regulation request being delivered to the Flow Controller 53. Once this has been completed the module returns to waiting for a new source or even update (step s700).

Referring now to FIG. 8, this illustrates an example of a process which may be performed by the Flow Controller 53 in FIG. 5.

When the xDSULAN gateway device 50 is powered on, this module is started at which point it initiates two concurrent processes. The first (steps s805 to s835) handles requests from the other modules and the second (steps s850 to s865) applies regulation, when required. Both processes wait when an "inactive" status is signalled.

In the first process, status updates are loaded (step s805), and it is determined whether they are "active" or "inactive" updates (s810). If they are "inactive", the process proceeds to step s835, at which the regulation table is flushed or reset, and any flows which were being regulated are de-regulated, then the process returns to step s805. The process therefore effectively waits for either a regulation request (step s815) or a new LAN source address to be detected (step s820) (e.g. a 'hook' into the xDSL gateway DHCP process/table). If new regulation is present (step s825) this is stored in the regulation table (step s830).

In the second process, while signalled active (step s850), Ethernet flows are monitored (for links to any regulated client devices (step s855). If it is found at step s860 that cumulative flows for a given client device (or for 'compound' client devices where the effect of flows on separate links are combined) exceed the regulation information then some form of regulation is required to be applied (step s865). The form of regulation may be determined by consulting a policy database which may be stored in a policy store 804, for example. Where regulation is required, packets may be dropped or latency introduced, for example—a variety of different mechanisms may be used for this. The process repeats from step s850 when again signalled active and/or in response to a new source address indication.

FIG. 9 is a block diagram of a computer system suitable for use in performing methods according to preferred embodiments. Such a system may be linked to or a part of an xDSL/LAN gateway device such as that shown in FIG. 1, 3 or 5. In such a computer system, a central processor unit (CPU) 902 is communicatively connected to a data store 904 and an input/output (I/O) interface 906 via a data bus 908. The data store 904 can be any read/write storage device or combination of devices such as a random access memory (RAM) or a non-volatile storage device, and can be used for storing executable and/or non-executable data. Examples of non-volatile storage devices include disk or tape storage devices. The I/O interface 906 is an interface to devices for the input or output of data, or for both input and output of data. Examples of I/O devices connectable to I/O interface 906 include a keyboard, a mouse, a display (such as a monitor) and a network connection.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the invention may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of identifying and of controlling communications on interfering links in a local area network, the local area network having at least one user-device located therein operable to communicate via a local area network gateway device with one or more remote devices in a communications network outside the local area network, communications being carried via one or more local area network links for at least a portion of a path between the at least one user-device and the local area network gateway device, and being carried via a digital subscriber line for at least a portion of a path between the local area network gateway device and the one or more remote devices, the method comprising:

triggering performance of a signal transmission action on at least one of said local area network links during a predetermined period, the signal transmission action comprising transmission of a signal at a known data flow rate on said at least one local area network link;

monitoring one or more digital subscriber line performance characteristics in respect of data communications on the digital subscriber line during said predetermined period whereby to identify changes in said one or more digital subscriber line performance characteristics;

classifying said at least one local area network link as an interfering link in the event that an identified change in said one or more digital subscriber line performance characteristics coincides with the predetermined period during which said signal transmission action has been performed;

the method further comprising adjusting the data flow rate in respect of data flow on a local area network link in the event that said local area network link is classified as an interfering link.

2. A method according to claim 1 wherein the step of triggering performance of a signal transmission action comprises the local area network gateway device performing an action which causes transmission of a signal at a known data flow rate on said at least one local area network link during said predetermined period.

3. A method according to claim 1 wherein the step of triggering performance of a signal transmission action comprises instructing at least one user-device to perform an action which causes transmission of a signal at a known data flow rate on said at least one local area network link during said predetermined period.

4. A method according to claim 1 wherein the step of triggering performance of a signal transmission action comprises instructing an intermediate signal transmission device on said at least one local area network link to perform an action which causes transmission of a signal at a known data flow rate on said at least one local area network link during said predetermined period.

5. A method according to claim 1 wherein the one or more local area network links include at least one local area network link at least a part of which comprises electrical power-supply wiring.

6. A method according to claim 1 wherein the one or more local area network links include at least one local area network link having at least one intermediate signal transmission device arranged to superpose a signal carrying data of said one or more data flows onto electrical power-supply wiring.

7. A method according to claim 1 wherein the method comprises identifying the presence on one or more local area network links of at least one intermediate signal transmission device, and triggering performance of a signal transmission action on said at least one local area network link during a predetermined period.

8. A method according to claim 1 wherein the step of monitoring comprises monitoring one or more digital subscriber line performance characteristics in respect of data communications on the digital subscriber line during said predetermined period whereby to identify changes in said one or more digital subscriber line performance characteristics above a predetermined threshold.

9. A method according to claim 1 wherein the step of monitoring one or more digital subscriber line performance characteristics in respect of data communications on the digital subscriber line comprises monitoring one or more digital subscriber line performance characteristics selected from speed characteristics, reliability characteristics, variability characteristics, stability characteristics and error-rate characteristics.

10. A method according to claim 1 wherein the method comprises triggering performance of a plurality of signal transmission actions on said at least one local area network link during different predetermined periods, the signal transmission actions comprising transmissions of signals at different known data flow rates on said at least one local area network link, monitoring one or more digital subscriber line performance characteristics in respect of data communications on the digital subscriber line during said predetermined periods whereby to identify changes in said one or more digital subscriber line performance characteristics during said predetermined periods, classifying said at least one local area network link as an interfering link at one of said predetermined data flow rates in the event that an identified change in said one or more digital subscriber line performance characteristics coincides with the predetermined period during which said signal transmission action at said predetermined data flow rate has been performed.

11. A method according to claim 1 wherein the method further comprises limiting the data flow rate in respect of data flows on a local area network link classified as an interfering link to a data flow rate at which said local area network link is not classified as an interfering link.

12. A method according to claim 1 wherein the step of adjusting the data flow rate in respect of data flow on a local area network link comprises one or more of:
   throttling the data flow rate in respect of said data flow on said local area network link;
   temporarily buffering data units of said data flow before transmitting said data units on said local area network link;
   dropping or re-directing data units of said data flow intended to be transmitted on said local area network link.

13. A method according to claim 1 wherein the step of adjusting the data flow rate in respect of said data flow on said local area network link comprises the local area network gateway device or a module associated therewith and/or the at least one user-device or a module associated therewith implementing the adjustment to the data flow rate in respect of said data flow on said local area network link.

14. Apparatus for identifying and for controlling communications on interfering links in a local area network, the local area network having at least one user-device located therein operable to communicate via a local area network gateway device with one or more remote devices in a communications network outside the local area network, communications being carried via one or more local area network links for at least a portion of a path between the at least one user-device and the local area network gateway device, and being carried via a digital subscriber line for at least a portion of a path between the local area network gateway device and the one or more remote devices, the apparatus comprising one or more processors configured to:
   trigger performance of a signal transmission action on at least one of said local area network links during a predetermined period, the signal transmission action comprising transmission of a signal at a known data flow rate on said at least one local area network link;
   monitor one or more digital subscriber line performance characteristics in respect of data communications on the digital subscriber line during said predetermined period whereby to identify changes in said one or more digital subscriber line performance characteristics;
   classify said at least one local area network link as an interfering link in the event that an identified change in said one or more digital subscriber line performance characteristics coincides with the predetermined period during which said signal transmission action has been performed; and
   adjust the data flow rate in respect of data flows on a local area network link in the event that said local area network link is classified as an interfering link.

15. A non-transitory computer-readable computer program code to, when loaded into a computer system and executed thereon, cause the computer to perform the steps of a method as claimed in any of claim 1.

* * * * *